United States Patent [19]

Iwatani

[11] Patent Number: 4,812,732
[45] Date of Patent: Mar. 14, 1989

[54] CONTROL DEVICE FOR AN A. C. GENERATOR FOR AN AUTOMOBILE

[75] Inventor: Shiro Iwatani, Himeji, Japan

[73] Assignee: Mitsubishi Denki Kabushiki Kaisha, Tokyo, Japan

[21] Appl. No.: 116,914

[22] Filed: Nov. 5, 1987

[30] Foreign Application Priority Data

Nov. 13, 1986 [JP] Japan .................. 61-270715

[51] Int. Cl.$^4$ .............................................. H02J 7/14
[52] U.S. Cl. ........................................................ 322/99
[58] Field of Search ...................................... 322/28, 99

[56] References Cited

U.S. PATENT DOCUMENTS

| 4,362,982 | 12/1982 | Akita et al. | 322/99 X |
| 4,477,766 | 10/1984 | Akita et al. | 322/99 X |
| 4,513,239 | 4/1985 | Morishita et al. | 322/99 |

FOREIGN PATENT DOCUMENTS 60-26495 1/1985 Japan .

Primary Examiner—R. J. Hickey
Attorney, Agent, or Firm—Oblon, Fisher, Spivak, McClelland & Maier

[57] ABSTRACT

In a control device for an a. c. generator for an automobile, a collector potential detecting transistor for detecting potential at the collector of an alarm lamp actuating transistor is provided independent from a controlling transistor which functions to control the alarm lamp actuating transistor. When the collector potential detecting transistor detects an abnormal potential, it becomes conductive to turn off the alarm lamp actuating transistor to thereby prevent flowing of a short-circuit current.

5 Claims, 2 Drawing Sheets

CONTROL DEVICE FOR AN A. C. GENERATOR FOR AN AUTOMOBILE

BACKGROUND OF THE INVENTION

1. Field of the Invention

The present invention relates to a control device for an a. c. generator for an automobile. More particularly, it relates to such a device for preventing breakage of a transistor for actuating an alarm device when a fault such as short-circuitting in the alarm device occurs.

2. Discussion of Background

FIG. 2 is a diagram showing a conventional control device for an a. c. generator. In FIG. 2, an a. c. generator 1 driven by an engine (not shown) mounted on an automobile comprises an armature winding 101 and a field winding 102. The a. c. generator 1 produces an alternating current output, which undergoes full wave rectification by a rectifier 2 having three output terminals 201, 202, 203.

The first output terminal 201 is the main output terminal for outputting a main output; the second output terminal 202 is an autiliary output terminal which excites the field coil 102 of the a. c. generator 1 and applies a rectified output voltage of the a. c. generator 1 to a voltage regulator 3 and an alarm device 4, and the third output terminal 203 is a ground terminal.

The voltage regulator 3 controls the output voltage of the a. c. generator 1 to be a predetermined value. The voltage regulator 3 comprises two voltage-dividing resisters 301, 302 which divides the output voltage at the autiliary output terminal 202. The connecting point between the voltage-dividing resisters 301, 302 is connected to the base of the transistor 304 through a Zener diode 303, which detectes the output voltage of the a. c. generator 1. When the Zener diode 303 is turned on, the transistor 304 is also turned on. When the Zener diode is turned off, the transistor 304 is also turned off.

The transistor 304 has its emitter grounded and its collector connected to the base of an output transistor 305. The base of the output transistor 305 is connected to the second output terminal 202 of the rectifier 2 through a resister 306. The emitter of the transistor 305 is grounded and the collector is connected to the second output terminal 202 through a diode 307.

The transistor 304 controls the turning-on and off of the output transistor 305, which in turn controls a field current in the field coil 102. The diode 307 is connected to the collector of the transistor 305 in parallel to the field coil 102 to absorb a surge current produced in the field coil 102.

The alarm device 4 which detects the output voltage of the a. c. generator 1 and generates an alarm, comprises an alarm lamp 9 and an alarm lamp actuating transistor 401 and a battery 5, wherein the collector 5 of the actuating transistor 401 is connected to the positive terminal of the battery 5 via the alarm lamp 9 and a key which 6, and the negative terminal of the battery is grounded. The emitter of the actuating transistor 401 is grounded and the base of the transistor 401 is connected to the collector of a controling transistor 402. The controlling transistor 402 is used to control the alarm lamp actuating transistor 401 and it has the emitter grounded and the collector connected to the base of the actuating transistor 401. The base of the actuating transistor 401 is connected to a connecting point for connecting the key switch 6 to a reverse current blocking diode 7 through a resister 404.

The base of the controlling transistor 402 is connected to one end of the field coil 102 through a Zener diode 403 and a resister 405.

The positive terminal of the battery 5 is connected to one end of the field coil 102 through the key switch 6, the reverse current blocking diode 7 and an initial-exciting resister 8 which controls excitation of the field coil 102 at initial stage.

The operation of the conventional control device will be described. When the key switch 6 is closed to start the engine, an initial-exciting current is fed from the battery 5 throught the key switch 6, the reverse current blocking diode 7 and the initial-exciting resister 8 to the field coil 102 whereby the a. c. generator 1 generates power. At this moment, potential at the autiliary output terminal 202 in the rectifier 2 takes a value obtained by dividing the voltage of the battery 5 by the initial-exciting resister 8 and the resister of the field coil 102, the value being relatively low.

A base current is supplied from the battery 5 through the key switch 6 and the resister 404 to the base of the alarm lamp actuating transistor 401 to turn on the same. When the transistor 401 becomes conductive, the alarm lamp 9 is lit. This displays that the a. c. generator generates no power.

When the engine is started to actuate the a. c. generator 1 for generation of power, the output voltage of the generator 1 is applied to the Zener diode 403 through the resister 405. When the generated voltage is increased to a predetermined value, the Zener diode 403 is turned on, whereby the controlling transistor 402 becomes a conductive state. Then, the alarm lamp actuating transistor 401 is turned off and the alarm lamp is turned off. Thus, the alarm device 4 displays that the a. c. generator 1 starts power generation.

In the voltage regulator 3, the voltage-dividing resisters 301, 302 and the Zener diode 303 detect the output of the a. c. generator 1, and when the output voltage of the generator 1 exceeds a voltage level determined by the resisters 301, 302 and the Zener diode 303, the Zener diode 303 is turned on to effect the transistor 304.

On the contrary, when the output voltage of the a. c. generator 1 is at more than the predetermined voltage level, the Zener diode 303 is turned off, whereby the transistor 304 is also turned off.

Thus, the output transistor 305 is turned on or off depending on the condition of the transistor 304 to thereby control a field current flowing in the field coil 102, with the result that the output voltage of the a. c. generator 1 is adjusted to be a predetermined range of voltage. In the convetional control device as described above, the alarm lamp 9 is lit when the key switch 6 is closed to start the engine, or when the output voltage of the a. c. generator 1 is decreased by any cause during the operation of the engine. Under the condition, when there takes place a short circuit in the alarm lamp 9 by any cause, a large short-circuit current flows in the alarm lamp actuating transistor 401. The large short-circuit current sometimes breaks the transistor. When the voltage of the battery 5 is erroneously supplied directly to the collector of the alarm lamp actuating transistor 401 during, for instance, maintenance works for the control device, a trouble similar to that as describe above takes place to thereby render the alarm device 4 to be inoperable. Thus, in the convention of control device for the a. c. generator for automobiles, there was such a drawback that the alarm device 4 becomes faulty by breakage of the alarm lamp actuating transistor 401 when a short-circuit takes place in the alarm lamp during the operation of the alarm lamp or there was an error in maintenance works.

SUMMARY OF THE INVENTION

It is an object of the present invention to provide a control device for an a. c. generator for an automobile which protects an alarm lamp actuating transistor to keep an alarm device to be in good operating condition even when there takes place a short-circuit in the alarm lamp or an error in connecting a wire during maintenance works.

The foregoing and the other objects of the present invention have been attained by providing a control device for an a. c. generator for an automobile which comprises a voltage regulator for controlling a current in the field coil of said a. c. generator to control an output voltage from the generator, and an alarm device comprising an alarm lamp actuating transistor for actuating an alarm lamp which gives a warning of abnormality in the a. c. generator, a controlling transistor for controlling the alarm lamp actuating transistor, and a collector potential detecting transistor adapted to be turned on when potential at the collector of the alarm lamp actuating transistor reaches a predetermined value or higher, to thereby turn off the same.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

PREFERRED EMBODIMENT OF THE PRESENT INVENTION

Figure 1:
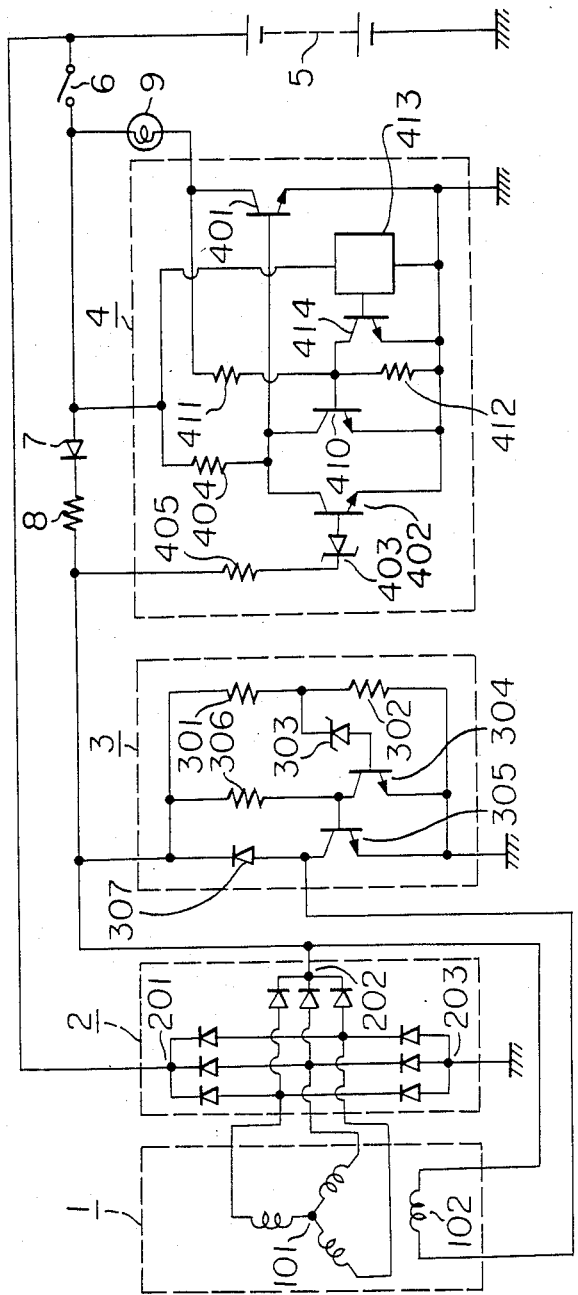
FIG. 1 is a circuit diagram of an embodiment of the control device for an a. c. generator for an automobile according to the present invention.
Figure 2:
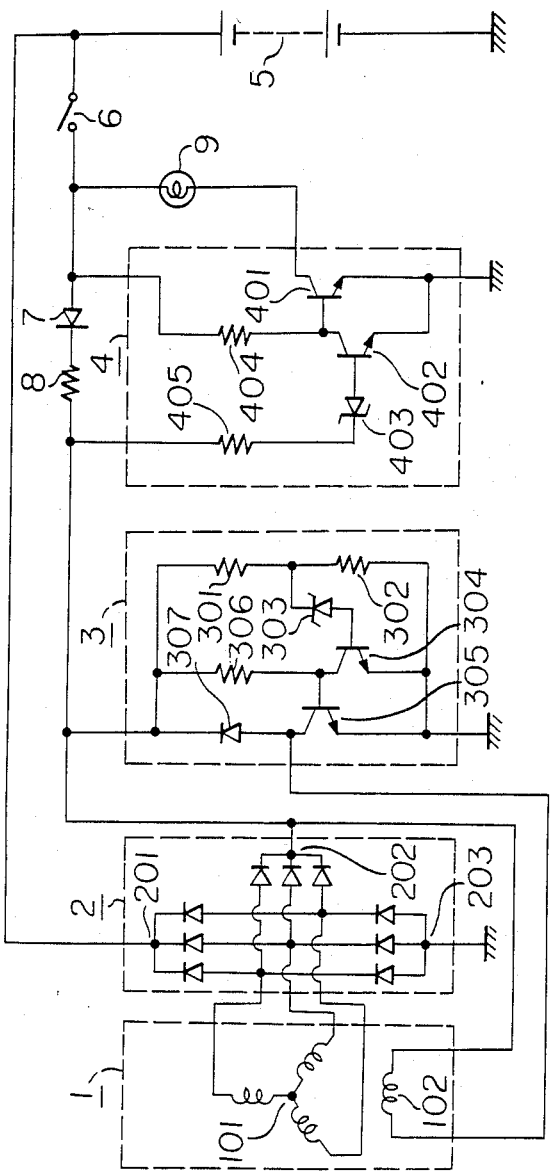
FIG. 2 is a circuit diagram of a conventional control device used for an automobile.

Referring now to the drawings, wherein like reference numerals designate identical or corresponding parts in the Figure and more particularly to FIG. 1, there is shown a circuit diagram of an embodiment of the control device for an a. c. generator for an automobile of the present invention. In FIG. 1, an alarm device 4 is provided with an alarm lamp actuating transistor 401, a collector potential detecting transistor 401 for detecting potential at the collector of the transistor 401, two voltage-dividing resisters 411, 412 which detect the potential of the collector of the alarm lamp actuating transistor 401 and determines a level of voltage, a trigger pulse generator 414 having a fixed frequency, and a transistor 414 which is actuated by receiving a trigger pulse from the trigger pulse generator 414 so that the collector potential detecting transistor 410 is momentarily turned off.

The collector and emitter of the collector potential detecting transistor 410 are respectively connected to the collector and the emitter of the controlling transistor 402, and the base of the collector potential detecting transistor 410 is connected to the connecting point between the voltage-dividing resisters 411, 412. A serial circuit of the voltage-dividing resisters 411, 412 is connected between the collector and emitter terminals of the alarm lamp actuating transistor 410. In other words, the serial circuit is connected in parallel to the alarm lamp actuacting transistor 410.

The trigger pulse generator 413 is connected between the ground and the connecting point connecting the reverse current blocking diode 7 to the key switch 6, and the output of the trigger pulse generator 413 is supplied to the base of the transistor 414.

The collector and emitter of the transistor 414 is connected in parallel to the voltage-dividing resister 412.

The operation of the embodiment according to the present invention will be described. The alarm lamp 9 is lit when the key switch 6 is closed to start the engine or when the output voltage of the a. c. generator 1 is decreased due to some cause in the same manner as the conventional control device. Under the condition, if there takes place a short circuit in the alarm lamp 9 by any cause, a large amount of short-circuit current flows in the alarm lamp actuating transistor 401. At the same time, the potential at the collector of the transistor 401 increases to the level of voltage of the battery 5. When the potential exceeds predetermined level of voltage determined by the voltage-dividing resisters 411, 412, the collector potential detecting transistor 410 is turned on, whereby the alarm lamp actuating transistor 401 is turned off; thus, the short-circuit current is blocked.

On the other hand, the collector potential detecting transistor 410 is momentarily turned off by the function of the transistor 414 which is actuated by receiving the trigger pulse of the trigger pulse generator 413. Accordingly, the alarm lamp actuating transistor 401 is momentarily turned on to pass the short-circuit current. However, the potential at the collector of alarm lamp actuating transistor increases again and the collector potential deticting transistor is turned on, whereby the alarm lamp actuating transistor 401 is turned off to thereby block the flow of the short-circuit current.

By repeating above-mentioned operations, the alarm lamp actuating transistor 401 is prevented from its breakage.

When the cause of short-circuit is eliminated, the alarm lamp actuating transistor 401 is turned on as soon as the collector potential detecting transistor 410 is momentarily turned off by the trigger pulse from the trigger pulse generator 413. Then, the alarm lamp 9 is lit and the alarm device 4 is returned to the normal condition of alarming.

There is a case that during maintenance works for the control device, the voltage of the battery 5 is erroneously applied directly to the collector terminal of the alarm lamp actuating transistor 401. Even in that case, the alarm lamp actuating transiter 401 can be protected in the same manner as the above-mentioned.

In the present invention, the collector potential detecting transistor 410 for controlling the alarm lamp actuating transistor 401 is used independently from the controlling transistor 402 which is inferenterly provided to control the alarm lamp actuating transistor 401. Accordingly, there is no trouble in control of the device when a short-circuit takes place in the device.

Thus, in accordance with the present invention, the collector potential detecting transistor detectes potential at the collector of the alarm lamp actuating transistor and is turned on when an abnormal potential is detected, whereby the alarm lamp actuating transistor is turned off to thereby prevent a short-circuit current from flowing in the alarm device.

Obviously, numerous modifications and variations of the present invention are possible in light of the above teachings. It is therfore to be understood that within the scope of the appended claims, the invention may be practiced otherwise than as specifically described herein.

What is claimed is:

1. A control device for an a.c. generator for an automobile which comprises:
   a voltage regulator for controlling a current in the field coil of said a.c. generator to control an output voltage from said generator, and
   an alarm device comprising an alarm lamp;
   an alarm lamp actuating transistor for actuating said alarm lamp which gives a warning of abnormality in said a.c. generator, a controlling transistor for controlling said alarm lamp actuating transistor, and
   a collector potential detecting transistor which is coupled to the collector of said alarm lamp actuating transistor and which is turned on when the potential of the collector of said alarm lamp actuating transistor reaches a predetermined value or higher, to thereby turn off the same.

2. The control device according to claim 1, wherein said controlling transistor has the collector and the emitter thereof are connected respectively to the base and the emitter of said alarm lamp actuating transistor.

3. The control device according to claim 1, wherein said collector potential detecting transistor is connected in parallel to said controlling transistor.

4. The control device according to claim 3, further comprising:
   a voltage dividing resistor and wherein the base of said collector potential detecting transistor is connected to a connecting point of said voltage dividing resistor which is connected between said alarm lamp and ground.

5. The control device according to claim 1, further comprising:
   a transistor;
   a trigger pulse generator; and
   wherein said collector potential detecting transfer is rendered to be momentarily turned off by a transistor actuated by trigger pulses outputted at fixed intervals by a trigger pulse generator.

* * * * *